United States Patent
Lee et al.

(10) Patent No.: US 9,028,950 B2
(45) Date of Patent: May 12, 2015

(54) DECORATION FILM HAVING MIRROR EFFECT

(71) Applicant: LG Electronics Inc., Seoul (KR)

(72) Inventors: Sangyong Lee, Seoul (KR); Kyungdo Kim, Seoul (KR); Hyungi Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/921,516

(22) Filed: Jun. 19, 2013

(65) Prior Publication Data

US 2013/0344307 A1  Dec. 26, 2013

(30) Foreign Application Priority Data

Jun. 25, 2012  (KR) ........................ 10-2012-0067808

(51) Int. Cl.
| | | |
|---|---|---|
| *B32B 3/00* | (2006.01) | |
| *B44F 1/04* | (2006.01) | |
| *B32B 7/12* | (2006.01) | |

(Continued)

(52) U.S. Cl.
CPC . *B44F 1/045* (2013.01); *B32B 7/12* (2013.01); *B32B 27/08* (2013.01); *B32B 27/304* (2013.01); *B32B 27/32* (2013.01); *B32B 27/36* (2013.01); *B32B 2255/20* (2013.01); *B32B 2255/205* (2013.01); *B32B 2307/416* (2013.01); *B32B 2405/00* (2013.01); *B32B 2451/00* (2013.01); *B32B 2509/10* (2013.01); *B44C 5/0407* (2013.01); *B32B 17/064* (2013.01); *B32B 2367/00* (2013.01)

(58) Field of Classification Search
CPC ................ B32B 7/12; B32B 2307/416; B32B 2307/4026

USPC ....................... 428/195.1, 201, 204
See application file for complete search history.

(56) References Cited

U.S. PATENT DOCUMENTS

2011/0223389 A1*  9/2011  Lin et al. ...................... 428/174
2012/0121832 A1*  5/2012  Jung et al. .................... 428/34.6

(Continued)

FOREIGN PATENT DOCUMENTS

| | | |
|---|---|---|
| CN | 102501465 A | 6/2012 |
| JP | H04 78600 A | 3/1992 |

(Continued)

OTHER PUBLICATIONS

Korean Office Action dated Oct. 20, 2013 for corresponding Application No. KR 10-2012-0067808.

(Continued)

*Primary Examiner* — Elizabeth Mulvaney
(74) *Attorney, Agent, or Firm* — Ked & Associates, LLP

(57) ABSTRACT

A decorative film having a mirror effect is provided for use in decorative panels of various home appliances. The decorative film may include a printing layer, a first base material layer that is a polyethylene terephthalate (PET) film, a deposition layer formed by depositing a metal material or an oxide material, and a second base material layer that is a scattering prevention film. The printing layer, the first base material layer, the deposition layer and the second base material layer may be sequentially laminated. The deposition layer formed on a lower surface of the first base material layer and the second base material layer may be adhered by an adhesive. The decorative film may be attached to a rear side of a glass panel by a gluing agent so as to obtain a mirror effect.

20 Claims, 12 Drawing Sheets

(51) Int. Cl.
*B32B 27/08* (2006.01)
*B32B 27/30* (2006.01)
*B32B 27/32* (2006.01)
*B32B 27/36* (2006.01)
*B44C 5/04* (2006.01)
*B32B 17/06* (2006.01)

(56) References Cited

U.S. PATENT DOCUMENTS

2012/0121865 A1* 5/2012 Jun et al. .................. 428/172
2013/0344275 A1* 12/2013 Shin et al. .................. 428/41.7

FOREIGN PATENT DOCUMENTS

| JP | H07-246366 A | 9/1995 |
| KR | 10-2010-0032601 A | 3/2010 |
| KR | 10-2011-0064880 A | 6/2011 |
| WO | WO 2009/140470 A1 | 11/2009 |

OTHER PUBLICATIONS

European Search Report dated Nov. 15, 2013 for corresponding Application No. 13172536.8.
European Office Action dated Mar. 4, 2015 issued in Application No. 13 172 536.8.

* cited by examiner

DECORATION FILM HAVING MIRROR EFFECT

CROSS-REFERENCE TO RELATED APPLICATION(S)

This application claims priority under 35 U.S.C. §119 to Korean Application No. 10-2012-0067808 filed on Jun. 25, 2012, whose entire disclosure is hereby incorporated by reference.

BACKGROUND

1. Field

This relates to a decorative film having a mirror effect.

2. Background

Various types of home appliances such as a refrigerator, an air conditioner, a washing machine, a cooking appliance, an air-conditioning system and the like include a main body and a door. A decorative panel including various colors, textures, patterns, and the like may be provided on the main body or door to improve an external appearance.

BRIEF DESCRIPTION OF THE DRAWINGS

The embodiments will be described in detail with reference to the following drawings in which like reference numerals refer to like elements wherein.

DETAILED DESCRIPTION

Features as embodied and broadly described herein may be applied not only to decorative panels of home appliances such as a refrigerator, a washing machine, an air conditioner, and the like, but also to various types of electronic devices such as, for example a smart phone.

In addition to the unique and various functions of home appliances, external appearance and design may also be important factors in customers' purchase decisions. For example, nickel (Ni) may be directly deposited on a rear side of a glass panel in order to provide a mirror effect to a decorative panel of a home appliance.

Figure 1:
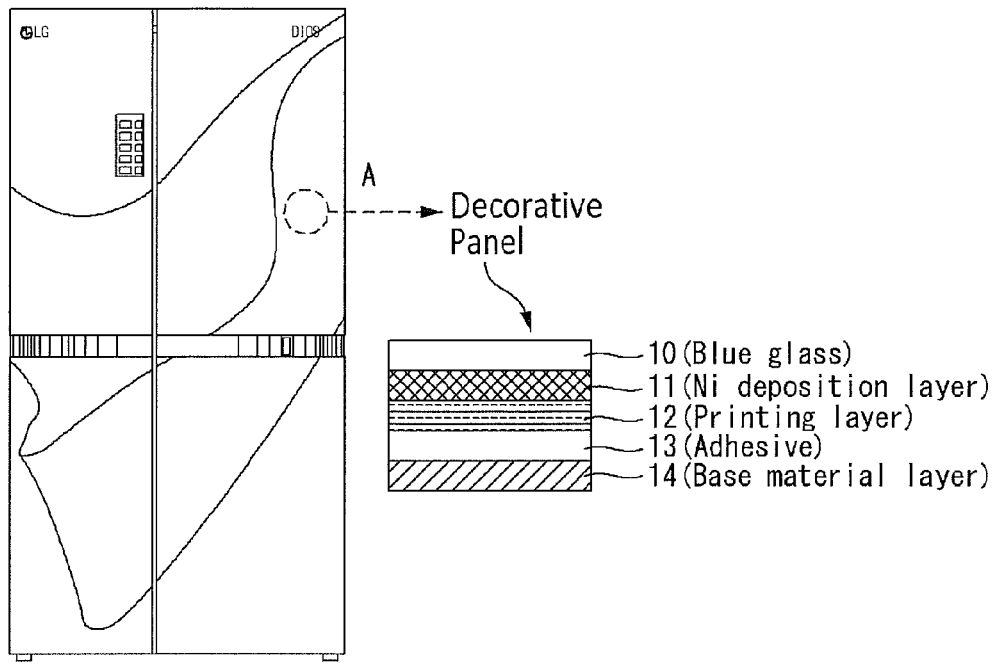
FIG. 1 illustrates a laminated structure of an exemplary decorative panel of a home appliance.
Figure 2:
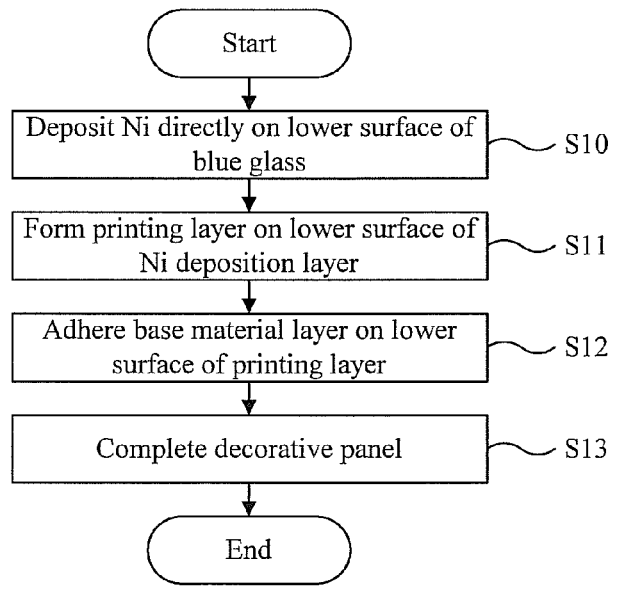
FIG. 2 is a flowchart of a process of manufacturing the exemplary decorative panel shown in FIG. 1.

FIGS. 1 and 2 illustrate the laminated structure and manufacturing process of such a decorative panel applied to a refrigerator. Nickel (Ni) may be directly deposited on a lower (interior facing) surface of a blue (or green) glass 10 (S10), and a printing layer 12 may be formed on a lower (interior facing) surface of a Ni deposition layer 11 formed by depositing the nickel (Ni), using a silk screen method (S11). Then, a base material layer 12 made of, for example, a PVC material, may be adhered to a lower (interior facing) surface of the printing layer 12, using an adhesive 13 (S12), thereby completing fabrication of the decorative panel having a mirror effect (S13). However, when nickel (Ni) is directly deposited on the lower surface of the blue glass 10 in this manner, the failure rate of the decorative panel may increase due to the Ni deposition process. Further, since this involves discontinuous batch type processing, productivity is lowered, and manufacturing cost is increased.

Figure 3:
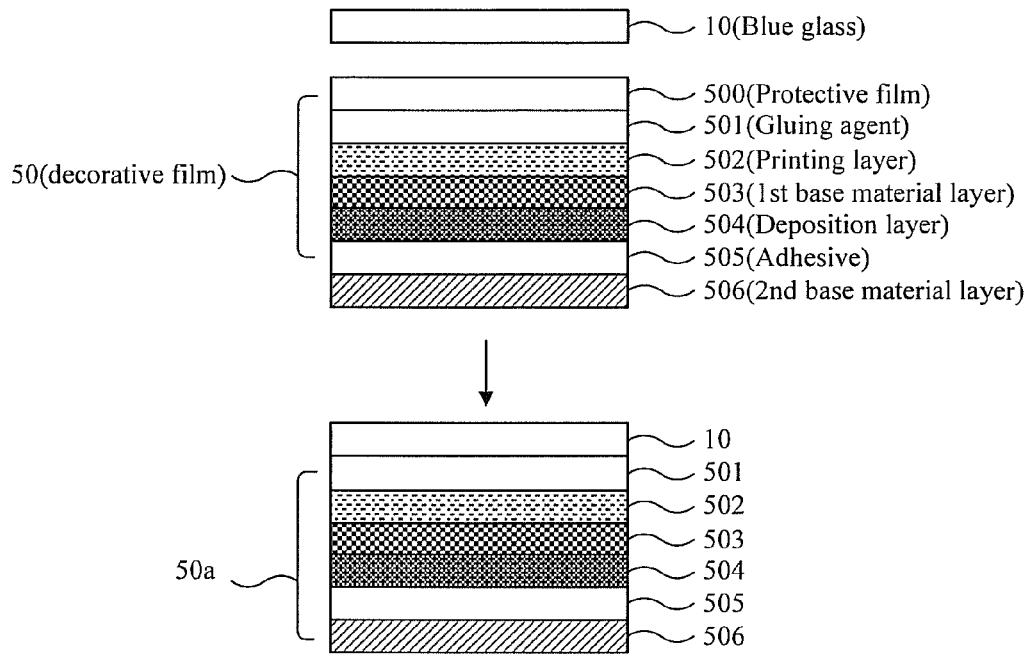
FIG. 3 illustrates a laminated structure of a decorative film according to an embodiment as broadly described herein.

FIG. 3 illustrates a laminated structure of a decorative film according to an embodiment, as broadly described herein, in which a white glass or a blue glass 10 (which may be less expensive than the white glass) may be used for a decorative panel of a home appliance such as a refrigerator.

In the embodiment shown in FIG. 3, a decorative film 50a having a protective film 500 removed therefrom is attached to a rear side of the blue glass 10 by a gluing agent 501, thereby forming a mirror effect. In this embodiment the film 50 has a structure in which the protective film 500, the gluing agent 501, a printing layer 502, a first base material layer 503, a deposition layer 504, an adhesive 505 and a second base material layer 506 are laminated.

The protective film 500 may be a simple cover film attached on the gluing agent 501 to allow the film to be rolled. The protective film 500 may be separated by a continuous roll-to-roll type manufacturing process of attaching the decoration film 50a to the rear side of the blue glass 10.

The gluing agent 501 may be coated on the printing layer 502 in order to allow the decorative film 50a to be adhered to the rear side of the blue glass 10. The gluing agent 501 may include a roll-type gluing agent having high optical transmittance, e.g., an optical clear adhesive (OCA) that is an optical transparent double-faced tape. The gluing agent 501 may have a structure in which the protective film is attached to one face of the optical transparent double-faced tape and a gluing agent having high transmittance is coated on the other face of the optical transparent double-faced tape.

The printing layer 502 may be printed on the first base material layer 503 using a gravure method so as to provide a color to the decoration panel. In order to provide a more luxurious, or intense, color, a micro gravure method having a higher printing density than that of a general gravure method may be applied to the printing layer 502.

The first base material layer 503 may include a polyethylene terephthalate (PET) film on which a metal material such as nickel (Ni) may be deposited in order to provide the mirror effect without directly depositing the nickel (Ni) on the rear side of the blue glass 10.

The second base material layer 506 may be adhered, by the adhesive 505, to the deposition layer 504 formed on a lower surface of the first base material layer 503. In this case, the second base material layer 506 may be a scattering prevention film for protecting a film laminated thereon and allowing the film to remain adhered even after glass is broken. The second base material layer 506 may include, for example, a polyethylene (PE) film or a poly vinyl chloride (PVC) film.

Figure 4:
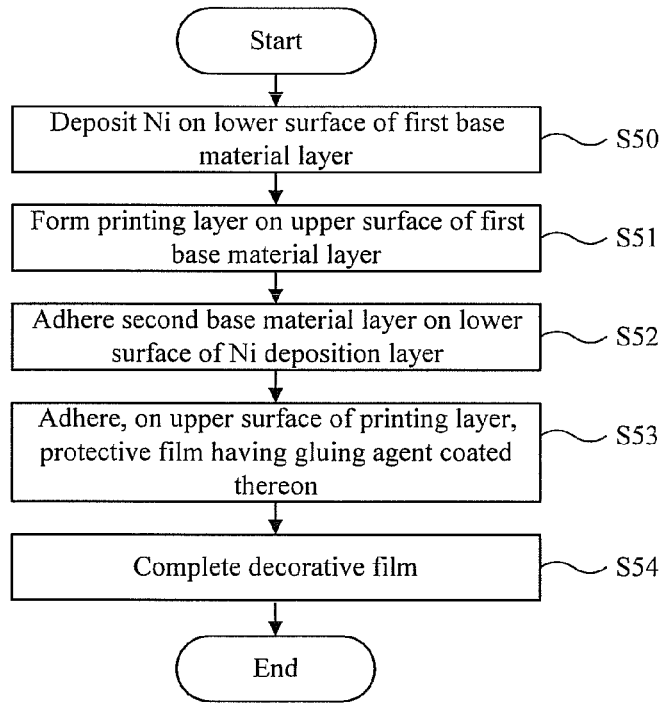
FIG. 4 is a flowchart of a process of manufacturing the decorative film shown in FIG. 3.
Figure 5:
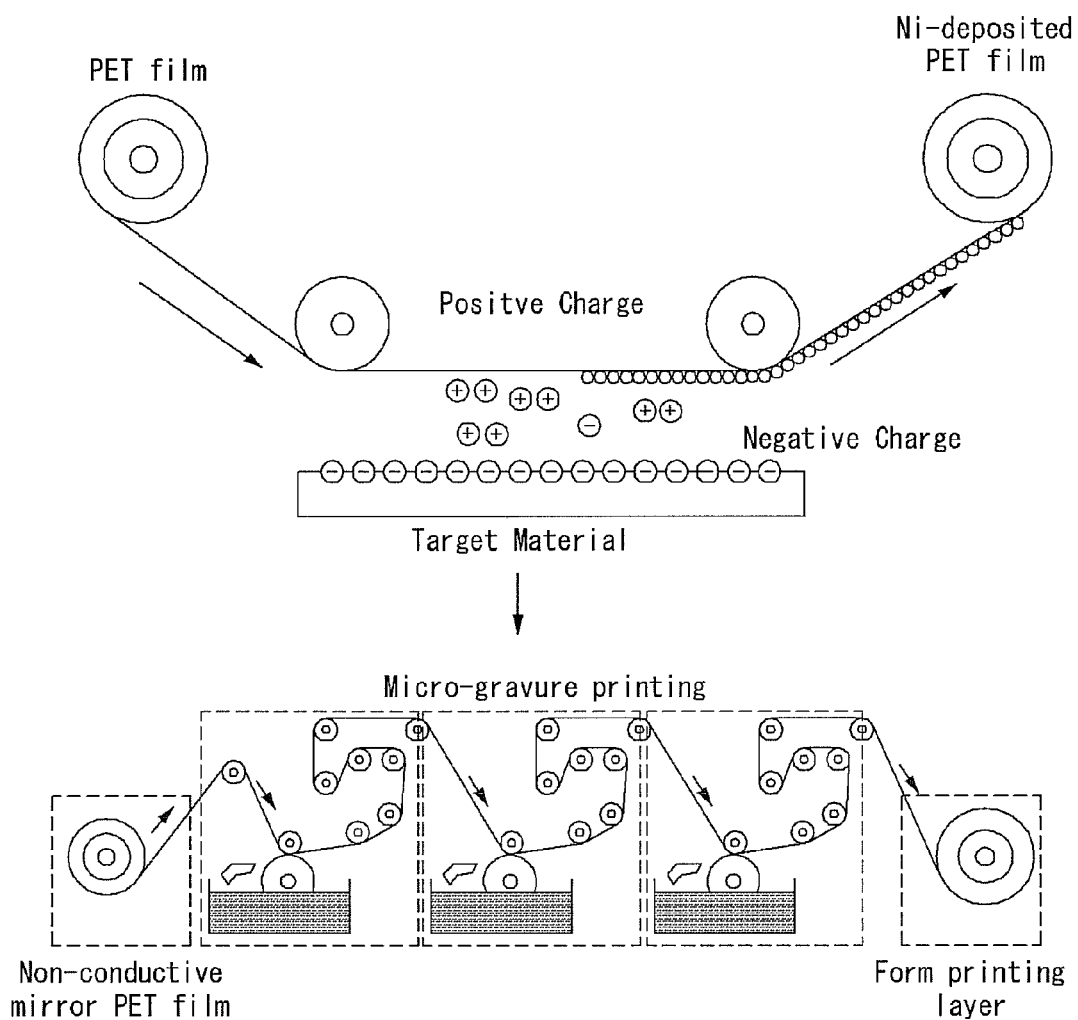
FIGS. 5 and 6 illustrate the process of manufacturing the decorative film shown in FIGS. 3 and 4.
Figure 6:
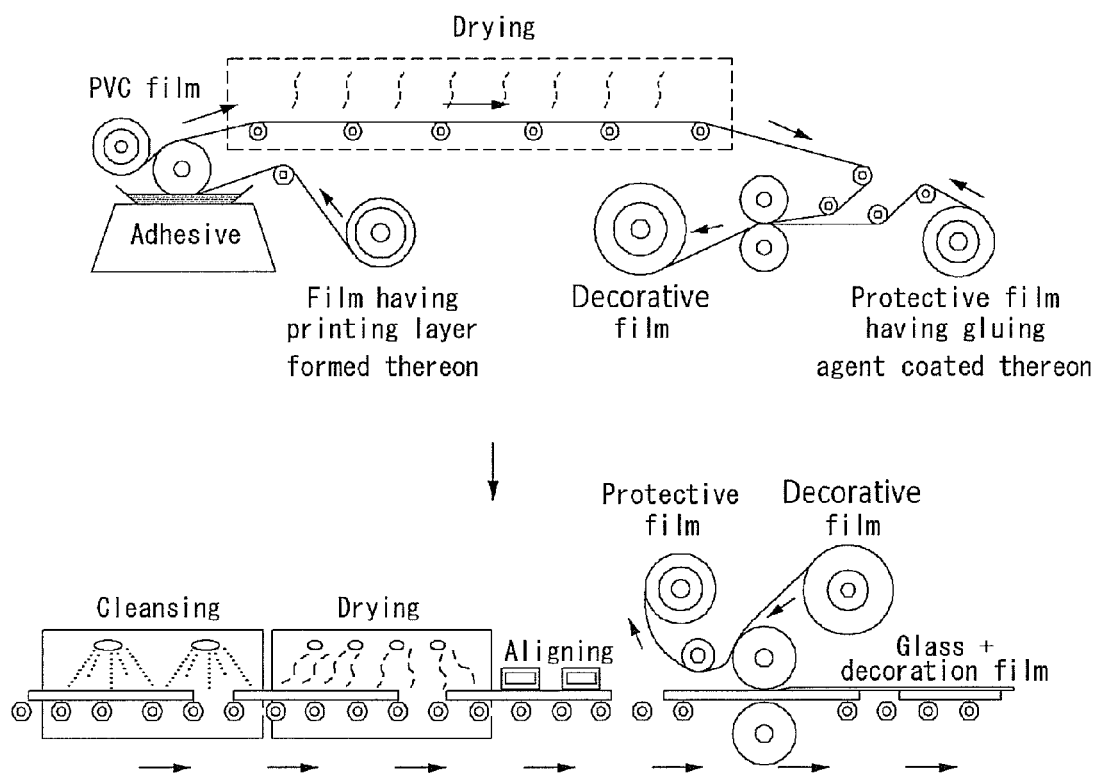

FIG. 4 is a flowchart of a process of manufacturing the decorative film shown in FIG. 3, and FIGS. 5 and 6 illustrate the process shown in FIG. 4. As shown in FIG. 5, nickel (Ni) for providing a mirror effect may be deposited on the lower surface of the first base material layer 503, which may be an optical PET having high optical transmittance, thereby forming the deposition layer 504 (S50).

Then, the printing layer 502 may be formed on the upper surface of the first base material layer 503 having the deposition layer 504 formed thereon, using a multi-stage micro gravure method (S51), thereby providing a desired color and/or design.

Subsequently, the adhesive 505 may be coated on the deposition layer 504 formed on the lower surface of the first base material layer 503, and the second base material layer 506, which may be one of the PE film or the PVC film serving as a scattering prevention film may then be adhered to the deposition layer 504 (S52).

The OCA, which may be a roll-type optical transparent double-faced tape having high optical transmittance, may be attached to the upper surface of the printing layer 502. For example, the protective film 500 may be attached to one surface of the printing layer 502, and the optical transparent double-faced tape, on which the gluing agent having high optical transmittance is coated, may be adhered to the upper surface, i.e., the other surface of the printing layer 502 (S53), thereby simply completing the roll-type decorative film 50 (S54).

That is, the decorative film 50 according to the embodiment shown in FIGS. 3-6 may be produced by a continuous roll-to-roll manufacturing process. In the manufacturing process, nickel (Ni) is deposited on the lower surface of the first base material layer 503 that is an optical PET film, and the printing layer 502 is formed on the upper surface of the first base material layer 503 through multiple stages, using the micro gravure method. The PVC film or PE film is adhered to the deposition layer deposited on the first base material layer by coating an adhesive on the deposition layer, and a drying process is then performed. Subsequently, a protective film, on which a gluing agent having high optical transmittance is coated, is adhered on the upper surface of the printing layer, thereby completing the decorative film.

A blue glass to which the decorative film is to be attached, as shown in FIG. 6, may pass through a preprocess including cleansing, drying, aligning and the like. Subsequently, the protective film attached to the uppermost layer of the decorative film 50 may be separated from the decoration film 50, so that the decorative panel may be continuously produced through a simple manufacturing process in which the decorative film 50a is adhered to the rear side of the blue glass.

Thus, according to the embodiment shown in FIGS. 3-6, the process of directly depositing the nickel (Ni) on the rear side of the blue glass may be eliminated, and the decorative film may instead be manufactured through the continuous roll-type manufacturing process rather than a discontinuous batch-type manufacturing process, so that failure rate of the decorative panel may be decreased and productivity may be increased.

Figure 7:
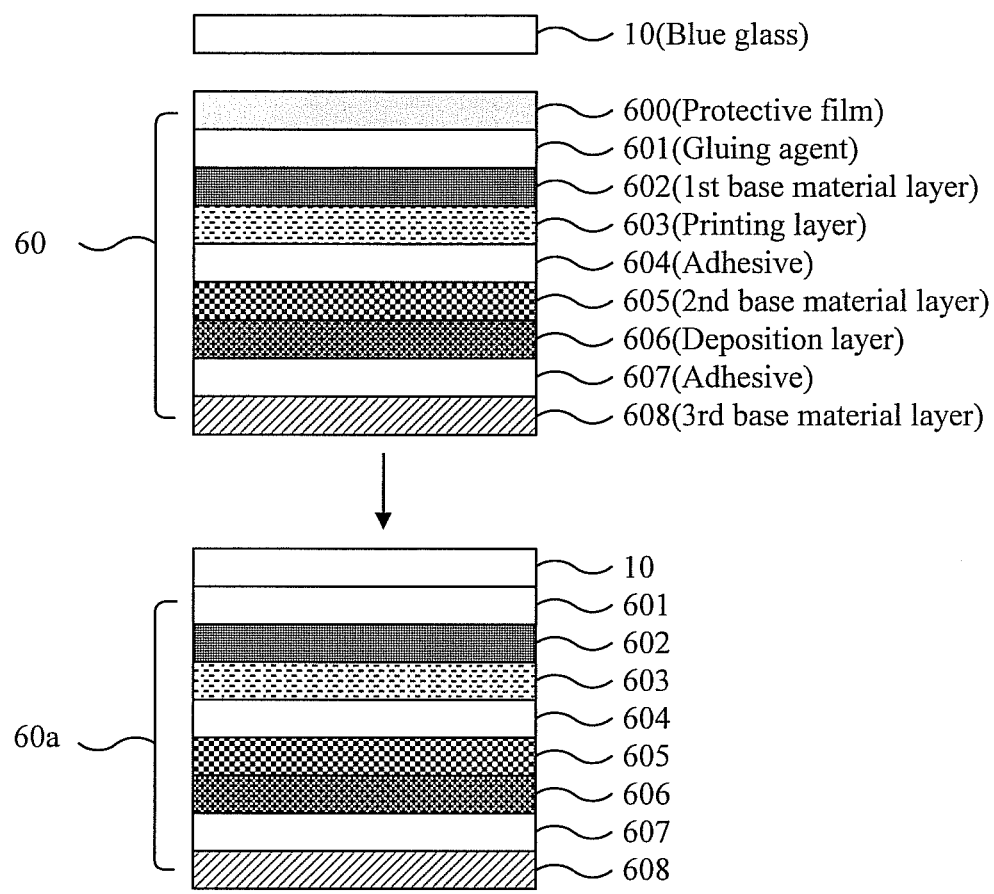
FIG. 7 illustrates a laminated structure of a decorative film according to another embodiment as broadly described herein.

FIG. 7 illustrates a laminated structure of a decorative film according to another embodiment as broadly described herein.

The decorative film 60 shown in FIG. 7 may have a structure in which a protective film 600, a gluing agent 601, a first base material layer 602, a printing layer 603, an adhesive 604, a second base material layer 605, a deposition layer 606, an adhesive 607 and a third base material layer 608 are laminated.

In the decorative film shown in FIG. 7, the protective film 600, the gluing agent 601, the printing layer 603, the second base material layer 605, the deposition layer 606, the adhesive 607 and the third base material layer 608 are similar to those discussed above with respect to FIG. 3. However, in FIG. 7, first base material layer 602 may be formed on an upper surface of the printing layer 603 and the printing layer 603 may be adhered to the second base material layer 605 by the adhesive 604.

The first base material layer 602 may be a roll-type PET film and may include an optical PET film having high optical transmittance. The printing layer 603 may be printed on a lower surface of the first base material layer 602, using a gravure method or micro gravure method, thereby providing a desired color and/or design.

The second base material layer 605 may be adhered to the lower surface of the printing layer 603 by the adhesive 604. In this case, the second base material layer 605 may include a PET film made of the same material as the first base material layer 503 of the embodiment shown in FIG. 3. Like the second base material layer 506 of the embodiment shown in FIG. 3, the third base material layer 608 may include one of the PE film or the PVC film.

Figure 8:
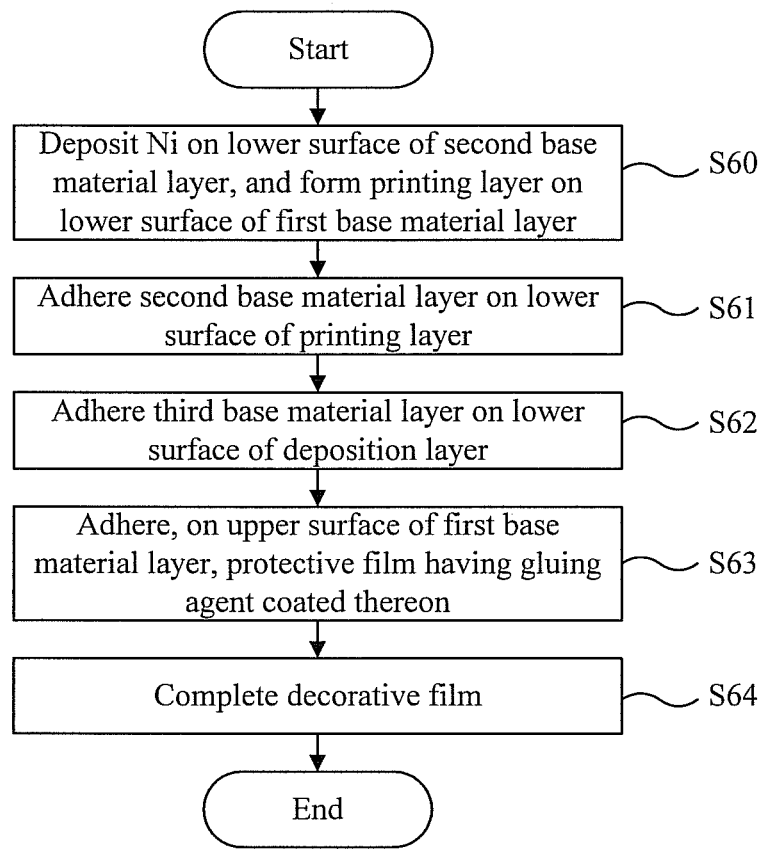
FIG. 8 is a flowchart of a process of manufacturing the decorative film shown in FIG. 7.

FIG. 8 is a flowchart of a process of manufacturing the decorative film shown in FIG. 7. In FIG. 8, nickel (Ni) for providing a mirror effect may be deposited on a lower surface of the second base material layer 605 that is an optical PET having high optical transmittance, thereby forming the deposition layer 606, and the printing layer 603 may be formed on a lower surface of the first base material layer 602 that is an optical PET film having high optical transmittance, using a multi-stage micro gravure method (S60).

The process of forming the deposition layer 605 on the lower surface of the second base material layer 605 and the process of forming the printing layer 603 on the lower surface of the first base material layer 605 may be performed as independent manufacturing processes or may be consecutively performed as dependent manufacturing processes.

The upper surface of the second base material layer 605 may be adhered to the lower surface of the printing layer 603 (S61), and the upper surface of the third base material layer 608 may be adhered to a lower surface of the deposition layer 606 (S62). Subsequently, a protective film having a gluing agent coated thereon may be adhered to the upper surface of the first base material 602 (S63).

For example, the protective film 600 may be attached to one surface of the first base material layer 602, and the optical transparent double-faced tape, on which a gluing agent having high optical transmittance is coated, may be adhered to the other surface of the first base material layer 602, thereby simply completing the roll-type decorative film 60 (S64).

Since the printing layer 603 formed on the lower surface of the first base material layer 602 and the gluing agent 601 coated on the upper surface of the first base material layer 602 do not come in contact with each other, it may be possible to prevent decolorization and the like due to chemical reactions/interactions.

Figure 9:
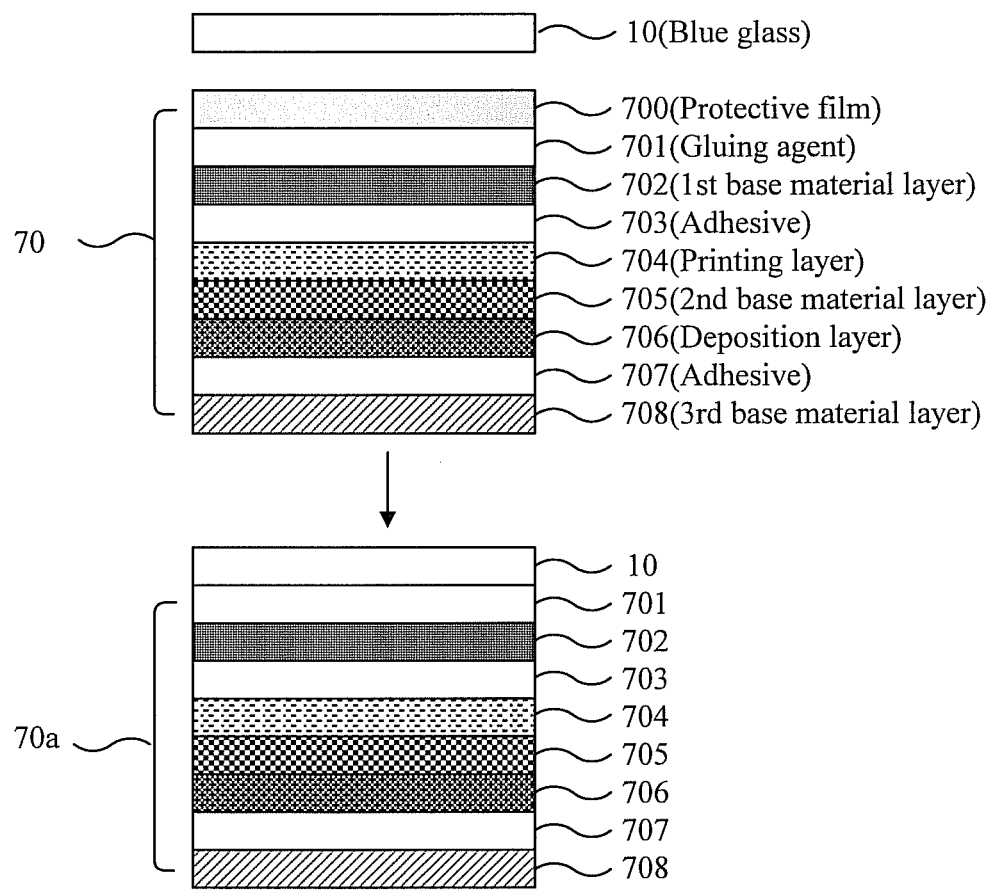
FIG. 9 illustrates a laminated structure of a decorative film according to another embodiment as broadly described herein.

FIG. 9 illustrates a laminated structure of a decorative film according to another embodiment as broadly described herein.

The decorative film 70 shown in FIG. 9 may have a structure in which a protective film 700, a gluing agent 701, a first base material layer 702, an adhesive 703, a printing layer 704, a second base material layer 705, a deposition layer 706, an adhesive 707 and a third base material layer 708 are laminated.

In the decorative film according to the embodiment shown in FIG. 9, the protective film 700, the gluing agent 701, the printing layer 704, the second base material layer 705, the deposition layer 706, the adhesive 707 and the third base material layer 708 may be similar to those discussed above with respect to previous embodiments. However, in FIG. 9 the first base material layer 702 and the adhesive 703 may be formed between the gluing agent 701 and the printing layer 704. The second base material layer 705, the deposition layer 706, the adhesive 707 and the third base material layer 708 may also be the same as the second base material layer 605, the deposition layer 606, the adhesive 607 and the third base material layer 608 of the previous embodiment.

The first base material layer 702 may include an optical PET film having high optical transmittance, and the second base material layer 705 may be adhered to a lower surface of the first base material layer 702. In this case, the printing layer 704 may be printed on an upper surface of the second base material layer 705, using a gravure method or micro gravure method, thereby providing a desired color and/or design.

Figure 10:
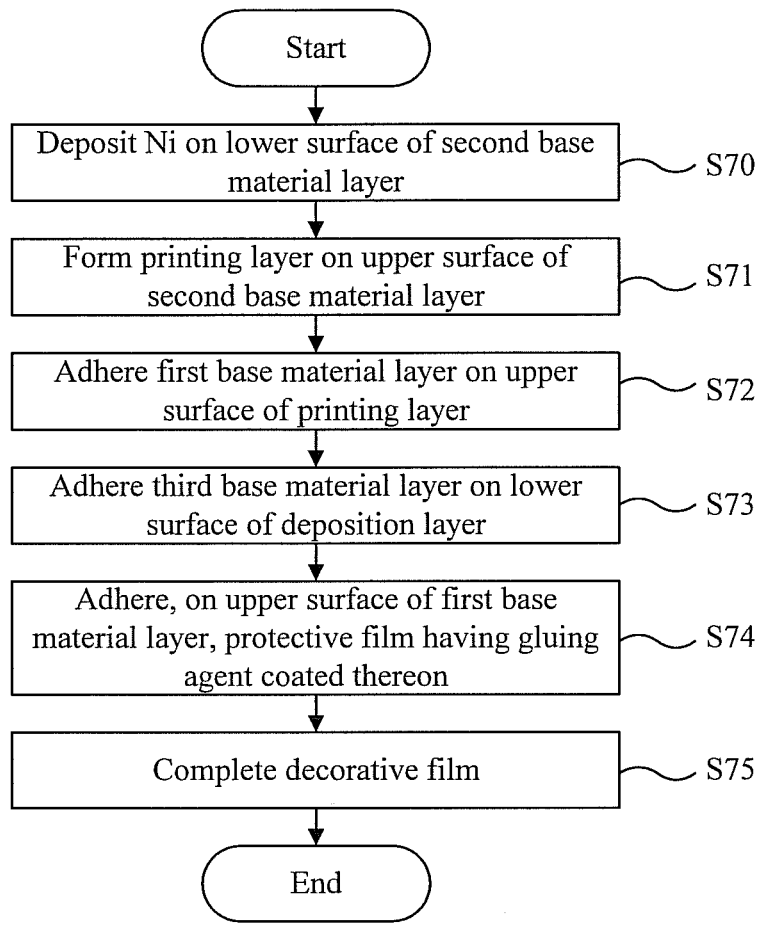
FIG. 10 is a flowchart of a process of manufacturing the decorative film shown in FIG. 9.

FIG. 10 is a flowchart of a process of manufacturing the decorative film shown in FIG. 9. In FIG. 10, nickel (Ni) for providing a mirror effect may be deposited on a lower surface of the second base material layer 705 that is an optical PET having high optical transmittance, thereby forming the deposition layer 706 (S70).

Then, the printing layer 704 may be formed on the upper surface of the second base material layer 705 having the deposition layer 706 formed thereon, using a multi-stage micro gravure method (S71), and the first base material layer 702 may be adhered to an upper surface of the printing layer 704 (S72).

The third base material layer 708 may be adhered to a lower surface of the deposition layer 706 (S73), and a protective film having a gluing agent coated thereon may be then be adhered to the upper surface of the first base material layer 702 (S74).

For example, the protective film 700 may be attached to one surface of the first base material layer 702, and the optical transparent double-faced tape, on which a gluing agent having high optical transmittance is coated, may be adhered to the other surface of the first base material layer 702, thereby simply completing the roll-type decorative film 70 (S75).

Since the printing layer 603 formed on the upper surface of the first base material layer 702 and the gluing agent 701 coated on the upper surface of the first base material layer 702 do not come in contact with each other, it may be possible to prevent decolorization and the like that may occur due to a chemical reaction interaction.

Figure 11:
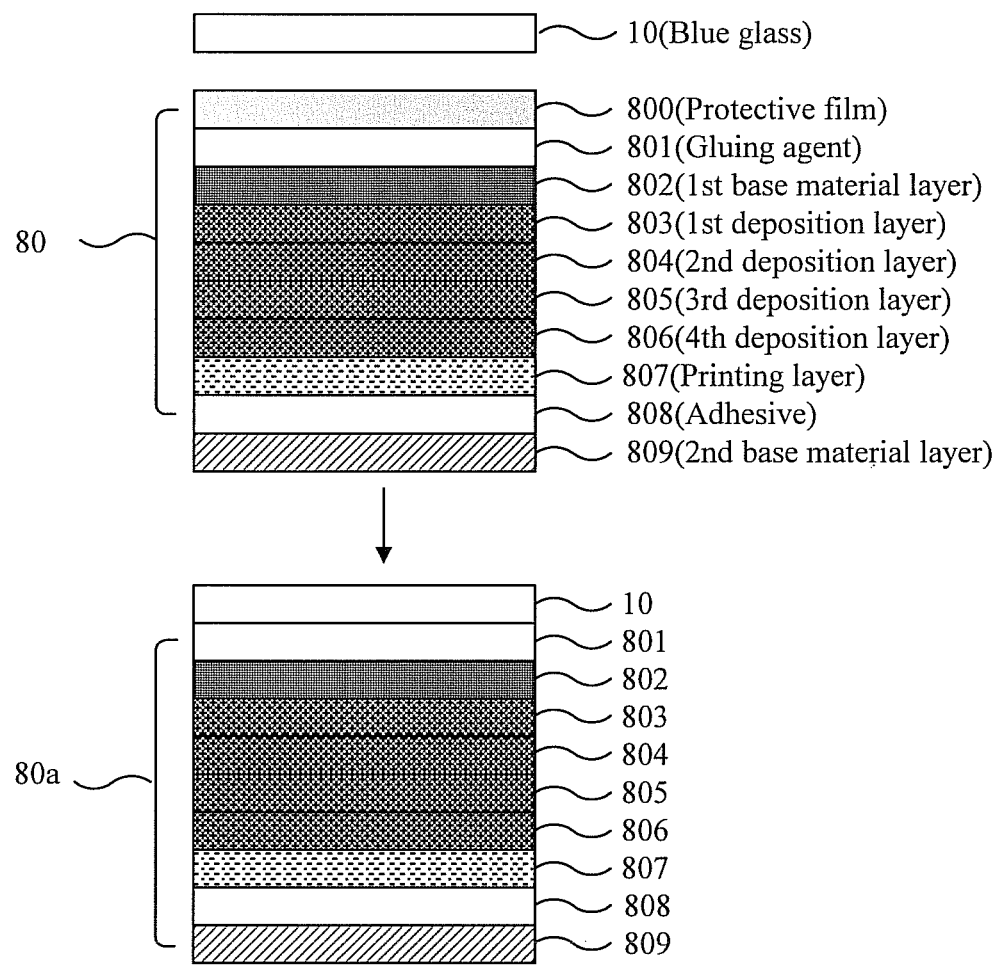
FIG. 11 illustrates a laminated structure of a decorative film according to another embodiment as broadly described herein.

FIG. 11 illustrates a laminated structure of a decorative film according to another embodiment as broadly described herein. In FIG. 11, a decorative film 80a having a protective film 800 removed therefrom may be attached to a rear side of a blue glass 10 by a gluing agent 801, thereby forming a decorative film having a mirror effect.

The decorative film 80 according to the fourth embodiment of the present invention may have a structure in which the protective film 800, the gluing agent 801, a first base material layer 802, a printing layer 807, an adhesive 808 and a second base material layer 809 are laminated. In this structure, a deposition layer formed by depositing oxide materials such as titanium dioxide (TiO2) and/or silicon dioxide (SiO2) may be laminated into a single- or multi-layered structure between the first base material layer 802 and the printing layer 807.

For example, a first deposition layer 803 made of the titanium dioxide (TiO2), a second deposition layer 804 made of the silicon dioxide (SiO2), a third deposition layer 805 made of the titanium dioxide (TiO2) and a fourth deposition layer 806 made of the silicon dioxide (SiO2) may be laminated into a multi-layered structure between the first base material layer 802 and the printing layer 807.

The deposition layer made of the titanium dioxide (TiO2) and the deposition layer made of the silicon dioxide (SiO2) may include an oxide material for obtaining a mirror effect with various textures, rather than a nickel (Ni) deposition layer made of a metal material. Silicon dioxide (SiO2) may be found in sand or quartz, and may also be distributed in cellular walls of diatoms. Silicon dioxide (SiO2) may be a main element of glass or concrete, and may have a physical property of transparency and a chemical property of stability.

Titanium dioxide (TiO2) is white powder with no taste and no smell as a molecule in which two atoms of oxygen are bonded to one atom of titanium that is transition metal. If titanium is exposed to air, titanium easily reacts with oxygen, thereby forming a titanium dioxide coating film. Titanium has high oxidation power and high stability.

In the decorative film according to the embodiment of FIG. 11, the other components constituting the laminated structure, i.e., the protective film 800, the gluing agent 801, the first base material layer 802, the printing layer 807, the adhesive 808 and the second base material layer 809 are substantially the same as the protective film 500, the gluing agent 501, the first base material layer 503, the printing layer 502, the adhesive 505 and the second base material layer 506 in the earlier embodiment.

The first base material layer 802 may include an optical PET film having high optical transmittance. In order to obtain the mirror effect, the first deposition layer 803 made of titanium dioxide (TiO2), the second deposition layer 804 made of silicon dioxide (SiO2), the third deposition layer 805 made of titanium dioxide (TiO2) and the fourth deposition layer 806 made of silicon dioxide (SiO2) may be laminated into a multi-layered structure on the lower surface of the first base material layer 802.

The printing layer 807 may be printed on a lower surface of the fourth deposition layer 806, using a gravure method or micro gravure method, thereby designing a providing a desired color and/or design. The third base material layer 809 may be adhered to the lower surface of the printing layer 807 by the adhesive 808.

Figure 12:
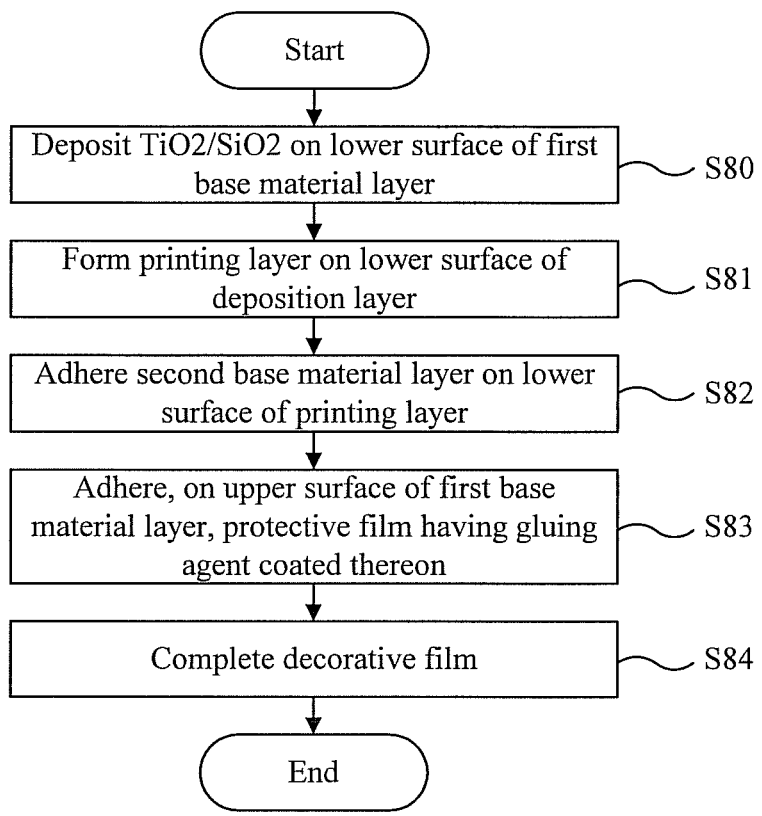
FIG. 12 is a flowchart of a process of manufacturing the decorative film shown in FIG. 11.

FIG. 12 is a flowchart of a process of manufacturing the decorative film shown in FIG. 11. In FIG. 12, the titanium dioxide (TiO2) and silicon dioxide (SiO2) used as materials for obtaining a mirror effect may be alternately deposited on the lower surface of the first base material layer 802 that is an optical PET film having high optical transmittance, thereby depositing the first deposition layer 803 made of titanium dioxide (TiO2), the second deposition layer 804 made of silicon dioxide (SiO2), the third deposition layer 805 made of titanium dioxide (TiO2) and the fourth deposition layer 806 made of silicon dioxide (SiO2) (S80).

Then, the printing layer 807 may be formed on the lower surface of the fourth deposition layer 806, using a multi-stage micro gravure method (S81), and the second base material layer 809 may be adhered to the lower surface of the printing layer 807 (S82).

A protective film having a gluing agent coated thereon may be adhered to the upper surface of the first base material layer 802 (S83). For example, the protective film 800 may be attached to one surface of the first base material layer 802, and the optical transparent double-faced tape, on which a gluing agent having high optical transmittance is coated, may be adhered to the other surface of the first base material layer 802, thereby simply completing the roll-type decorative film 80 (S84).

Since the printing layer 807 and the gluing agent 801 do not come in contact with each other, it may be possible to prevent decolorization and the like can occur due to a chemical reaction/interaction. Further, oxide materials such as titanium dioxide (TiO2) and silicon dioxide (SiO2) are deposited rather than a metal material such as nickel (Ni), thereby obtaining a mirror effect with various textures.

Figure 13:
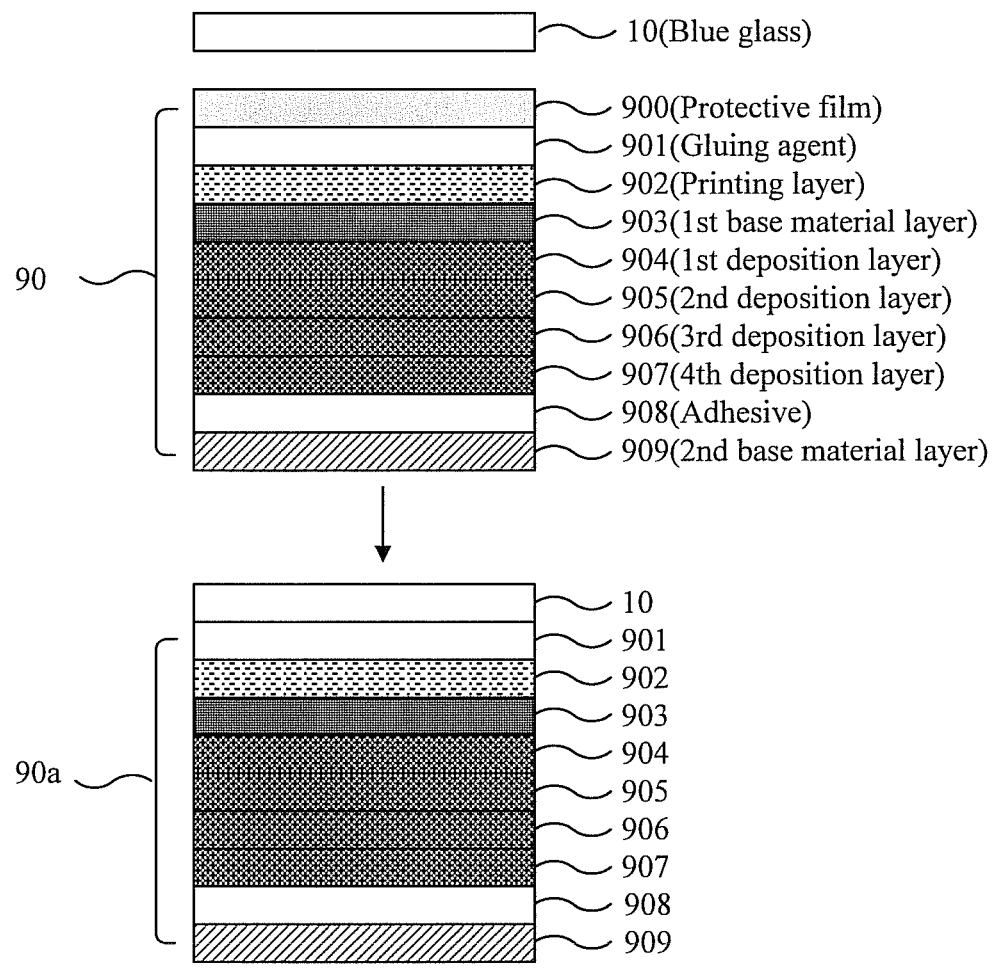
FIG. 13 illustrates a laminated structure of a decorative film according to another embodiment as broadly described herein.

FIG. 13 illustrates a laminated structure of a decorative film according to another embodiment as broadly described herein.

The decorative film 90 may have a structure in which a protective film 900, a gluing agent 901, a printing layer 902, a first base material layer 908 and a second base material layer 909 are laminated. In this structure, a deposition layer formed by depositing oxide materials such as titanium dioxide (TiO2) and/or silicon dioxide (SiO2) may be laminated into a single- or multi-layered structure between the first base material layer 903 and the adhesive 908.

For example, a first deposition layer 904 made of titanium dioxide (TiO2), a second deposition layer 905 made of silicon dioxide (SiO2), a third deposition layer 906 made of titanium dioxide (TiO2) and a fourth deposition layer 907 made of silicon dioxide (SiO2) may be laminated into a multi-layered structure on a lower surface of the first base material layer 903.

In the decorative film according to the embodiment of FIG. 13, the components are substantially the same as those of the embodiment of FIG. 11, except that the printing layer 902 is formed on an upper surface of the first base material layer 903 and the first to fourth deposition layers 904 to 907 are formed on the lower surface of the first base material layer 903, i.e., the laminated order of the components.

The gluing agent 901 may be coated on the printing layer 902 formed on the first base material layer 903 in order to allow a decorative film 90a to be adhered to the rear side of the blue glass 10. The gluing agent 901 may include an OCA that is an optical transparent double-faced tape.

In order to obtain a mirror effect, the first to fourth deposition layers 904 to 907 may be laminated into a multi-layered structure on the lower surface of the first base material layer 903.

The printing layer 902 may be printed on the upper surface of the first base material layer 903, using a gravure method or micro gravure method, thereby providing a desired color and/or design.

The second base material layer 909 may be adhered to a lower surface of the fourth deposition layer 907 by the adhesive 908.

In the embodiment of FIG. 13, the other components and the laminated order is similar to those of the embodiment of FIG. 7, except the materials constituting the deposition layer. That is, a third base material layer having high optical transmittance may be laminated between the gluing agent 901 and the printing layer 902, and the printing layer 902 and the first base material layer 903 may be adhered by an adhesive. Further, in the embodiment of FIG. 13, the other components and the laminated order may be similar to those of the embodiment of FIG. 9, except the materials constituting the deposition layer. That is, the gluing agent 901 may be coated on an upper surface of the third base material layer that is an optical PET film having high optical transmittance, and the printing layer 902 formed on the upper surface of the first base material layer 903 and the third base material layer may be adhered by an adhesive.

Figure 14:
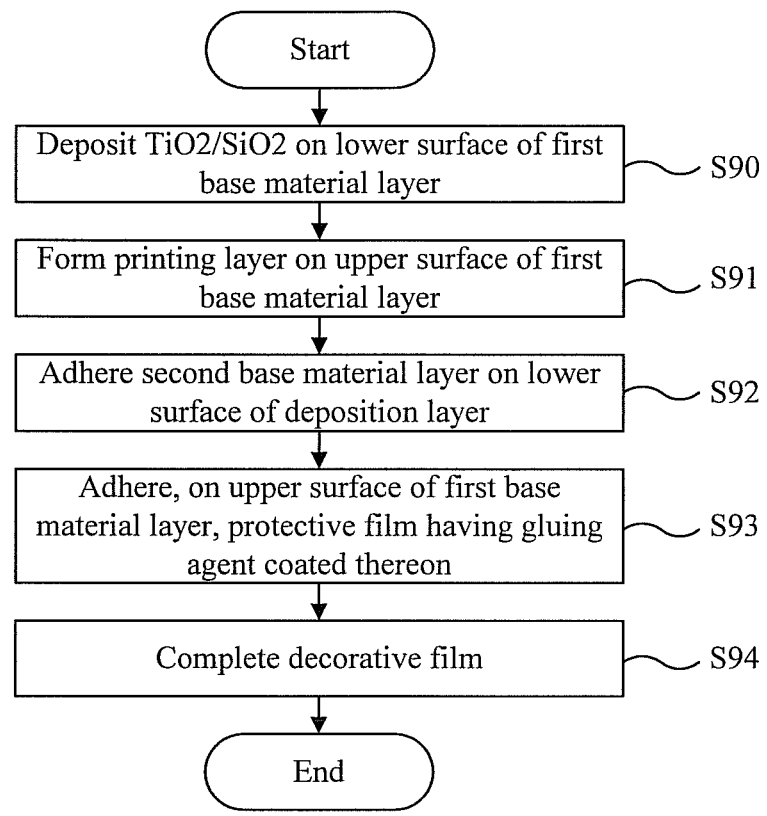
FIG. 14 is a flowchart of a process of manufacturing the decorative film shown in FIG. 13.

FIG. 14 is a flowchart illustrating a process of manufacturing the decorative film according to the embodiment show in FIG. 13. In FIG. 14, titanium dioxide (TiO2) and silicon dioxide (SiO2) used as materials for obtaining a mirror effect may be alternately deposited on the lower surface of the first base material layer 903 that is an optical PET film having high optical transmittance, thereby depositing the first deposition layer 904 made of titanium dioxide (TiO2), the second deposition layer 905 made of silicon dioxide (SiO2), the third deposition layer 906 made of titanium dioxide (TiO2) and the fourth deposition layer 907 made of silicon dioxide (SiO2) (S90).

Then, the printing layer 902 may be formed on the upper surface of the first base material layer 903, using a multi-stage micro gravure method (S91), and the second base material layer 909 may be adhered to the lower surface of the fourth deposition layer 907 (S92).

A protective film having a gluing agent coated thereon may be adhered to the upper surface of the first base material layer 903 (S83). For example, the protective film 900 may be attached to one surface of the first base material layer 903, and the optical transparent double-faced tape, on which a gluing agent having high optical transmittance is coated, may be adhered to the other surface of the first base material layer 903, thereby simply completing the roll-type decorative film 90 (S94).

Oxide materials such as titanium dioxide (TiO2) and silicon dioxide (SiO2) may be deposited, rather than a metal material such as nickel (Ni), thereby obtaining a mirror effect with various textures.

As described above, a structure and operational example of one embodiment of a refrigerator has been described in detail with reference to appended drawings. However, embodiments are not limited to the above. It should be understood by those skilled in the art that various modifications and implementation of different embodiments having equivalent scope would be possible. Therefore, actual scope should be determined by what are defined by the appended claims.

A decoration film having a mirror effect is provided which may improve productivity by more efficiently performing and simplifying the manufacturing process of the decoration panel.

A decoration film according to one embodiment as broadly described herein may include a printing layer; a first base material layer that is a polyethylene terephthalate (PET) film; a deposition layer formed by depositing a metal material or oxide material; and a second base material layer that is a scattering prevention film, wherein the printing layer, the first base material layer, the deposition layer and the second base material layer are sequentially laminated, wherein the deposition layer formed on a lower surface of the first base material layer and the second base material layer are adhered by an adhesive, and wherein the decoration film is attached to a rear side of glass by a gluing agent so as to obtain a mirror effect.

A decoration film according to another embodiment as broadly described herein may include a first base material layer that is a PET film; a deposition layer formed by depositing an oxide material; a printing layer; and a second base material layer that is a scattering prevention film, wherein the first base material, the deposition layer, the printing layer and the second base material layer are sequentially laminated, wherein the printing layer formed on a lower surface of the deposition layer and the second base material layer are adhered by an adhesive, and wherein the decoration film is attached to a rear side of glass by a gluing agent so as to obtain a mirror effect.

In certain embodiments, the printing layer may be formed on a lower surface of a third base material layer that is a PET film, and the gluing agent may be coated on an upper surface of the third base material layer. An adhesive may be coated on a lower surface of the printing layer so that the printing layer is adhered to the first base material layer.

In certain embodiments, the gluing agent may be coated on a upper surface of a third base material layer that is the PET film, and the first base material having the printing layer formed on an upper surface thereof and the third base material layer may be adhered by an adhesive.

In certain embodiments, the PET film may be an optical PET film having high optical transmittance.

In certain embodiments, the printing layer may be formed using a micro gravure method.

In certain embodiments, the gluing agent may include an optical clear adhesive (OCA).

In certain embodiments, a protective film may be adhered on the gluing agent. The protective film may be separated in a process of attaching the decoration film to the rear side of the glass.

In certain embodiments, the gluing agent may be formed in the shape of a double-faced tape. The protective film may be attached to one side of the double-faced tape, and the OCA can be coated on the other side of the double-faced tape.

In certain embodiments, the scattering prevention film may be any one of a polyethylene (PE) film and a poly vinyl chloride (PVC) film, for protecting a film laminated thereon and allowing the film to be adhered even after glass is broken.

In certain embodiments, the decoration film may be a roll-type decoration film.

In certain embodiments, the metal material may be nickel that obtains the mirror effect.

In certain embodiments, the oxide material may be titanium dioxide and/or silicon dioxide that obtain/obtains the mirror effect.

In certain embodiments, the deposition layer may be formed by forming layers with the respective titanium dioxide and silicon dioxide and alternately laminating the formed layers.

A method of manufacturing a decoration film according to another embodiment as broadly described herein may include forming a deposition layer by depositing a metal material on a lower surface of a first base material layer that is a PET film; forming a printing layer on an upper surface of the first base material layer; adhering a second base material layer that is a scattering prevention film to the deposition layer by coating an adhesive on a lower surface of the deposition layer; and adhering a protective film on which a gluing agent having high optical transmittance is coated to an upper surface of the printing layer.

A method of manufacturing a decoration film according to another embodiment as broadly described herein may include forming a deposition layer by depositing a metal material on a lower surface of a second base material layer that is a PET film; forming a printing layer on a lower surface of a first base material that is a PET film; adhering the second base material layer to the printing layer by coating an adhesive on a lower surface of the printing layer; adhering a third base material layer that is a scattering prevention film to the deposition layer by coating an adhesive on a lower surface of the deposition layer; and adhering a protective film on which a gluing agent having high optical transmittance is coated to an upper surface of the first base material layer.

A method of manufacturing a decoration film according to another embodiment as broadly described herein may include forming a deposition layer by depositing a metal material on a lower surface of a second base material layer that is a PET film; forming a printing layer on an upper surface of the second base material layer; adhering a first base material layer that is a PET film to an upper surface of the printing layer; adhering a third base material layer that is a scattering prevention film to the deposition layer by coating an adhesive on a lower surface of the deposition layer; and adhering a protective film on which a gluing agent having high optical transmittance is coated to an upper surface of the first base material layer.

In a decoration panel according to another embodiment as broadly described herein, in which glass is attached to a decoration film so as to form a front side of the decoration panel, the decoration film may be formed by sequentially laminating a printing layer, a first base material layer that is a PET film, a deposition layer formed by depositing a metal material or oxide material, and a second base material layer that is a scattering prevention film; the deposition layer formed on a lower surface of the first base material and the second base material layer are adhered by an adhesive; and the decoration film is attached to a rear side of glass by a gluing agent so as to obtain a mirror effect.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A decorative film, comprising:
   a printing layer;
   a first base material layer comprising a polyethylene terephthalate (PET) film;
   a deposition layer comprising a deposited metal material or oxide material; and
   a second base material layer comprising a scattering prevention film,
   wherein the printing layer, the first base material layer, the deposition layer and the second base material layer are sequentially laminated,
   wherein the deposition layer formed on a lower surface of the first base material layer and the second base material layer are adhered by an adhesive, and
   wherein the metal material of the deposition layer is nickel.

2. The decorative film of claim 1, further comprising a third base material layer comprising a PET film, wherein the printing layer is formed on a lower surface of the third base material layer, and the gluing agent is coated on an upper surface of the third base material layer, and wherein an adhesive is coated on a lower surface of the printing layer so that the printing layer is adhered to the first base material layer.

3. The decorative film of claim 1, wherein a gluing agent is coated on an upper surface of a third base material layer comprising a PET film, and the first base material layer having the printing layer formed on an upper surface thereof and the third base material layer are adhered by an adhesive.

4. The decorative film of claim 1, wherein the PET film of the first base material layer is an optical PET film having high optical transmittance.

5. The decorative film of claim 1, wherein the printing layer is a micro gravure formed printing layer.

6. The decorative film of claim 1, wherein the gluing agent includes an optical clear adhesive (OCA).

7. The decorative film of claim 1, further comprising a protective film removably adhered on a gluing agent, wherein the protective film is configured to be separated from the decorative film to expose the gluing agent for attaching the decorative film to a rear side of a glass panel.

8. The decorative film of claim 7, wherein the gluing agent comprises a double-faced tape, and wherein the protective film is attached to a first side of the double-faced tape, and the OCA is coated on a second side of the double-faced tape.

9. The decorative film of claim 1, wherein the scattering prevention film comprises a polyethylene (PE) film or a poly vinyl chloride (PVC) film.

10. The decorative film of claim 9, wherein the decorative film is configured to be attached to a glass panel so as to achieve a mirror effect, and wherein the scattering prevention film is configured such that the glass panel remains adhered thereto even when the glass panel is broken.

11. The decorative film of claim 1, wherein the decorative film is a roll-type decorative film.

12. The decorative film of claim 1, wherein the oxide material of the deposition layer is at least one of titanium dioxide or silicon dioxide to obtain a mirror effect.

13. The decorative film of claim 12, wherein the deposition layer comprises a plurality of titanium dioxide layers and silicon dioxide layers alternately arranged and laminated.

14. A decorative panel, comprising:
a glass panel; and
a decorative film attached to a rear side of the glass panel by a gluing agent to generate a mirror effect, the decorative film comprising:
a first base material layer comprising a PET film;
a deposition layer including a deposited metal material or an oxide material;
a printing layer; and
a second base material layer comprising a scattering prevention film,
wherein the first base material layer, the deposition layer, the printing layer and the second base material layer are sequentially laminated,
wherein the printing layer formed on a lower surface of the deposition layer and the second base material layer are adhered by an adhesive, and
wherein the metal material of the deposition layer is nickel.

15. A home appliance comprising the decorative panel of claim 14.

16. A method of manufacturing a decorative film, the method comprising:
forming a deposition layer, comprising depositing a metal material on a lower surface of a first base material layer that is a PET film;
forming a printing layer on an upper surface of the first base material layer;
coating an adhesive on a lower surface of the deposition layer and adhering a second base material layer comprising a scattering prevention film to the lower surface of the deposition layer; and
adhering a protective film on which a gluing agent having high optical transmittance is coated to an upper surface of the printing layer,
wherein the metal material of the deposition layer is nickel.

17. A method of manufacturing a decorative film, comprising:
forming a deposition layer, comprising depositing a metal material on a lower surface of a second base material layer that is a PET film;
forming a printing layer on a lower surface of a first base material that is a PET film;
coating an adhesive on a lower surface of the printing layer and adhering the second base material layer to the lower surface of the printing layer;
coating an adhesive on a lower surface of the deposition layer and adhering a third base material layer that is a scattering prevention film to the lower surface of the deposition layer; and
adhering a protective film including a gluing agent having high optical transmittance coated thereon to an upper surface of the first base material layer.

18. A method of manufacturing a decorative film, the method comprising:
forming a deposition layer, comprising depositing a metal material on a lower surface of a second base material layer that is a PET film;
forming a printing layer on an upper surface of the second base material layer;
adhering a first base material layer that is a PET film to an upper surface of the printing layer;
coating an adhesive on a lower surface of the deposition layer and adhering a third base material layer that is a scattering prevention film to the lower surface of the deposition layer; and
adhering a protective film including a gluing agent having high optical transmittance coated thereon to an upper surface of the first base material layer,
wherein the metal material of the deposition layer is nickel.

19. A decorative panel, comprising:
a glass panel; and
a decorative film attached to a rear side of the glass panel by a gluing agent to generate a mirror effect, the decorative film comprising:
a printing layer;
a first base material layer comprising a PET film;
a deposition layer including a deposited metal material or an oxide material; and
a second base material layer comprising a scattering prevention film,
wherein the printing layer, the first base material layer, the deposition layer and the second base material layer are sequentially laminated,
wherein the deposition layer formed on a lower surface of the first base material layer and the second base material layer are adhered by an adhesive, and
wherein the metal material of the deposition layer is nickel.

20. A home appliance comprising the decorative panel of claim 19.

* * * * *